United States Patent [19]

Brogårdh et al.

[11] Patent Number: 4,539,473
[45] Date of Patent: Sep. 3, 1985

[54] OPTICALLY EXCITABLE LUMINESCENT SENSOR ELEMENTS

[75] Inventors: Torgny Brogårdh; Christer Ovren, both of Västerås, Sweden

[73] Assignee: Asea Aktiebolag, Västerås, Sweden

[21] Appl. No.: 625,619

[22] Filed: Jun. 28, 1984

Related U.S. Application Data

[63] Continuation-in-part of Ser. No. 306,349, Sep. 28, 1981, abandoned.

[30] Foreign Application Priority Data

Sep. 29, 1980 [SE] Sweden ..................... 8006797

[51] Int. Cl.³ .................. G01K 11/20; H01L 33/00
[52] U.S. Cl. ........................... 250/211 R; 250/231 R; 250/231 P; 250/487.1; 357/30; 73/777; 374/161
[58] Field of Search ............ 250/211 J, 211 R, 231 R, 250/231 P, 486.1, 487.1, 488.1; 357/17, 19, 26, 30, 52; 372/44, 45; 73/777, 800; 356/32; 374/161

[56] References Cited

U.S. PATENT DOCUMENTS

| | | | |
|---|---|---|---|
| 3,993,506 | 11/1976 | Moon | 250/211 J X |
| 4,047,123 | 9/1977 | Kirkby | 372/45 |
| 4,218,692 | 8/1980 | de Cremoux | 357/19 |
| 4,409,476 | 10/1983 | Lofgren et al. | 374/161 |
| 4,410,993 | 10/1983 | Zschauer | 372/44 |
| 4,473,747 | 9/1984 | Brogardh et al. | 250/231 R |

Primary Examiner—Edward P. Westin
Attorney, Agent, or Firm—Watson Cole Grindle & Watson

[57] ABSTRACT

A sensor element adaptable for measurement of a physical parameter formed of a crystalline material and emitting luminescent spectra upon excitation by light spectra and the influence of said physical parameter. A first layer emitting luminescent spectra is formed of a semiconductor material containing dopant providing shallow energy levels and recombination centers with a concentration between $10^{15}$ to $10^{18}$ cm$^{-3}$, and sandwiched between second and third layers of semiconductor material having low absorption for light excitation of the first layer, and the respective lattice constants of the second and third layers being substantially coincidental with the lattice constant of the first layer. The sensor element is formed of GaAs for the substrate and AlGaAs for the semiconductor layers, with appropriate variation in the concentration of Al, Ga, and As for the various layers. Generally, the energy band gap of the layers sandwiching the luminescent emitting layer are higher than that of the emitting layer. In a modified embodiment, GaAs is used as the luminescence emitting layer with covering semiconductor layers of AlGaAs, with appropriate variation in the concentration of Al, Ga and As. In a further modification an additional semiconductor layer of AlGaAs is sandwiched between the active semiconductor layer and a non-active semiconductor layer to reduce or eliminate a shift in the wavelength emission of the sensor element.

23 Claims, 13 Drawing Figures

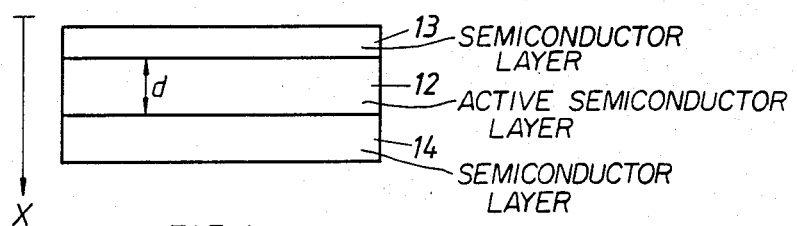
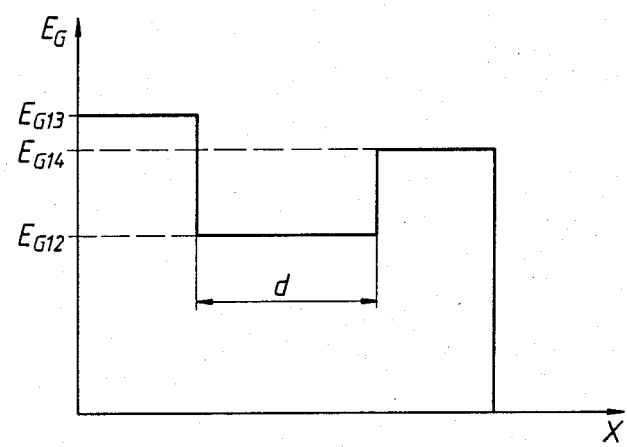
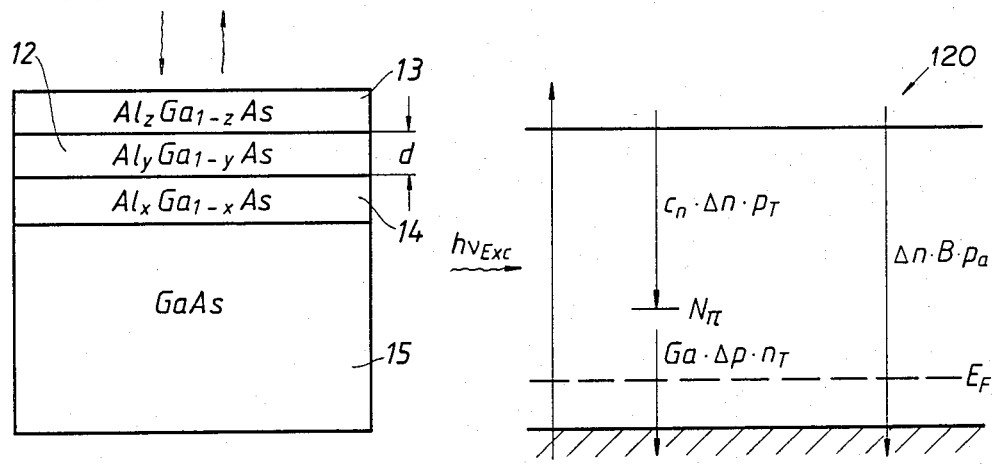

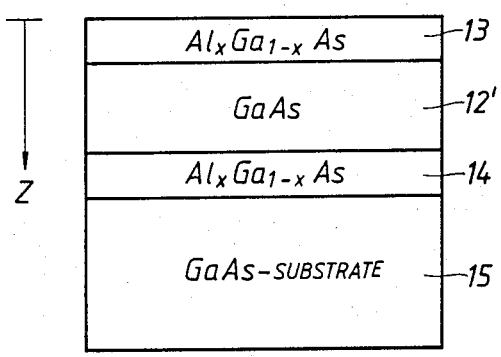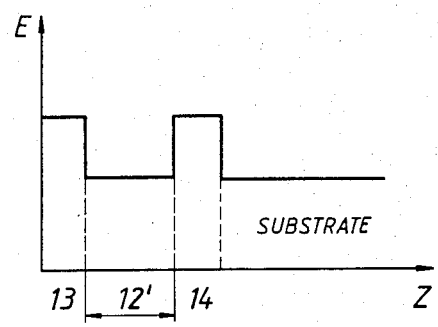
FIG.9a    FIG.9b
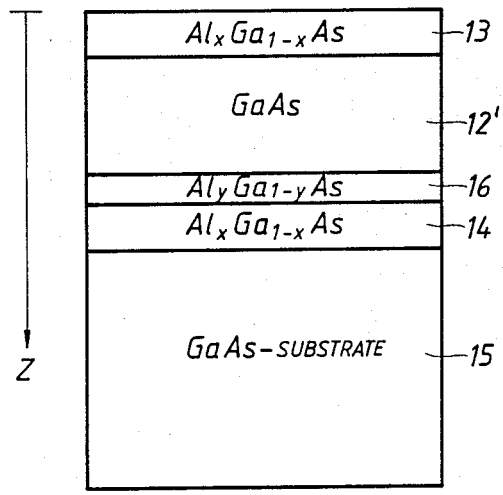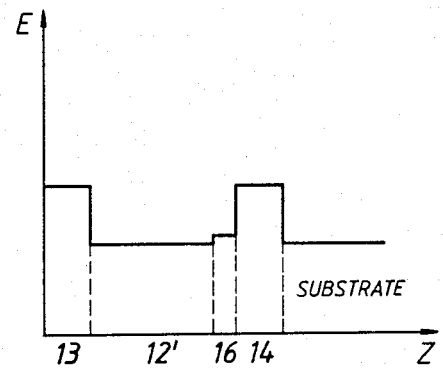
FIG.10a    FIG.10b
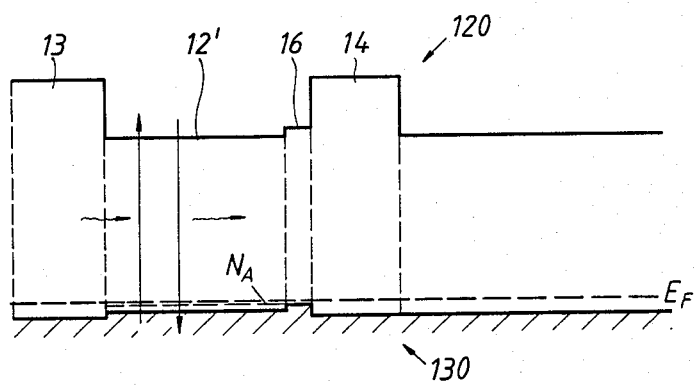
FIG.11

OPTICALLY EXCITABLE LUMINESCENT SENSOR ELEMENTS

This application is a Continuation-in-Part application of application Ser. No. 306,349, filed Sept. 28, 1981 and now abandoned.

TECHNICAL FIELD

The present invention relates to optically excitable luminescent sensor elements for sensing physical quantities such as temperature and pressure, which elements are optically excited and emit photoluminescent light as a measure of the quantity being sensed, and more particularly to multi-layer structures utilizing an active photoluminescent light-emitting layer sandwiched between respective semiconductor layers having higher band gaps than the active layer.

BACKGROUND ART

From patent literature and from other technical publications it is known to utilize photoluminescence in semiconductor materials for measurement of parameters, such as temperature and pressure. The sensor in these known devices is illuminated with incident light via an optical fiber. Through this illumination, light of a wavelength different from that of the incident excitation light is generated by photoluminescence in the material. This emitted luminescent light can be analyzed in different ways, for example with regard to total intensity, spectral distribution or with respect to its dynamic properties. Irrespective of which of the above-mentioned methods is utilized it is desirable that the sensor material has a high external efficiency. A higher signal level can then be obtained in the detector, and thus a higher signal/noise ratio is obtained. If a semiconductor material is utilized in the sensor so that band-band excitation takes place, this will occur near the surface of the sensor, whereby the efficiency of the sensor is often limited by recombination of excited charge carriers via energy states near the surface of the crystal. This creates problems when it is desired to manufacture sensors with high efficiency.

For a material such as GaAs, it has been reported that the luminescence spectrum is changed by heat treatment. This change is due to the formation of new recombination paths caused by a modification of the material near its surface. In measuring devices in which spectral analysis is carried out, this phenomenon may have an effect on the long-term stability of the measuring device.

In those cases where the measuring system utilizes some form of analysis of dynamic properties of the luminescent light, it is desirable for the sensor material to exhibit an exponential curve during increase and decay of the luminescent light. If this is the case, the measuring system can be simply designed so that the relation between the quantity to be measured and the measuring signal becomes independent of the excitation intensity, to compensate for any instability in the fiber optics and for any drift in a light-emitting diode used for the incident excitation light.

In the majority of Group II-VI semiconductor materials with a high luminescence intensity, the technical literature indicates a non-exponential time dependence, which is usually caused by so-called traps in the semiconductor material.

SUMMARY OF THE INVENTION

Fiber optical transducers for measurement of parameters, such as temperature and pressure, can thus be based on changes in the photoluminescence spectrum of semiconductor materials caused by variation of the external parameters. A fiber-optic temperature-measuring apparatus is known which comprises a body of a temperature-dependent photoluminescent solid material which is to be subjected to the temperature to be measured. The body luminesces by a radiation excitation source coupled to the luminescent body by fiber-optic means. An electro-optical measuring means is used for generating an electrical output related to an optical input representative of the photoluminescent emission of the photo-luminescent body and transmitted by fiber-optic means.

Considerable technical advantages can be gained with such transducer systems, if sensor materials with reproducible properties with respect to the shape of the spectrum of the luminescent radiation can be manufactured. In systems where the emitted light is generated by band-band recombinations, the number of recombination processes per unit time, at which light is emitted, is proportional to the majority carrier concentration, that is, in the case of a P-type semiconductor, proportional to the acceptor concentration, $N_A$. Since these "radiating" recombination processes compete with recombination processes at which the surplus energy of the charge carriers is not emitted in the form of light ("non-radiating" processes), the quantum efficiency $\eta$ of the material becomes dependent on $N_A$. The actual shape of the curve obtained will be determined by the "non-radiating" recombination processes, which are determined among other things, by material defects and surface conditions. The luminescent material may with advantage be realized as an epitactic layer of GaAs, produced, for example, by liquid phase epitaxy. In such layers the total lifetime of the charge carriers is determined, among other things, by recombinations occurring at the boundary surfaces of the layer.

From the above it will be appreciated that it is desirable to give the epitactic layer a high value of acceptor concentration $N_A$ to obtain a high quantum efficiency.

The present invention provides a semiconductor structure, which seeks to eliminate the problems discussed above in connection with, inter alia, temperature and pressure measurement, by the use of fiber optical photoluminescent-emitting sensors. The sensor element according to the invention is partly characterized in that the luminescent material included in the sensor is a layer sandwiched between material with low absorption for the excitation and luminescent light. Thus, in accordance with the invention, there is provided a structure which includes a luminescent layer (e.g. of semiconductor material) in which absorption and recombination takes place, which is sandwiched between material with low absorption for the excitation wavelengths and the luminescence wavelengths. The manufacture of such a structure can be carried out by a simple modification of known crystal cultivation methods. Another feature of the invention is that the material between which the active luminescent layer is sandwiched is selected to have a lattice constant which, as closely as possible, coincides with the lattice constant of the active layer, so that the recombination at the boundary surfaces between the different materials is limited.

Another significant feature of the invention is that reproducible luminescent spectra can be obtained with relatively low acceptor concentrations Na, for example $10^{15}$–$10^{17}$ cm$^{-3}$, by using an active semiconductor layer sandwiched between semiconductor layers having higher energy band gaps and lower dopant concentrations than the active semiconductor layer.

The invention as described herein incorporates GaAs and well known dopants such as Si, Se and Te for n-type doping and Si, Zn and Cd for p-type doping. Elements such as Cu, O and Yb, for example, can also be used as dopants since such elements create recombination centers without affecting the carrier concentration.

Semiconductor compositions such as $Al_xGa_{1-x}As$, $GaAs_xP_{1-x}$, $In_xGa_{1-x}P_{1-y}$ and other ternary and quaternary group III-V (inclusive) semiconductor elements can also be used in the sensor element. High luminescence efficiency can be obtained even with relatively low dopant concentrations ($10^{15}$–$10^{17}$cm$^{-3}$) with GaAs:Ge, for example.

BRIEF DESCRIPTION OF THE DRAWINGS

The above advantages, features and objects of the invention are readily apparent from a consideration of the following description of the best mode of carrying out the invention when taken in conjunction with the accompanying drawings wherein:

FIG. 1 shows a basic embodiment of the invention;

FIG. 2 shows the energy gap diagram for the structure of FIG. 1;

FIG. 3 shows another embodiment of the invention;

FIGS. 4 and 5 show energy level diagrams relating to the operation of the structures of FIGS. 1 and 3;

FIGS. 9a and 10a illustrate respective additional embodiments of sensor elements according to the invention, with FIG. 10a representing a preferred embodiment thereof;

FIGS. 9b and 10b are energy gap diagrams relating to the elements of FIGS. 9a and 10a, respectively; and FIG. 11 illustrates FIG. 10b in more detail.

Throughout the Figures like designations represent similar or identical elements.

DETAILED DESCRIPTION OF THE EMBODIMENTS

Figure 5:
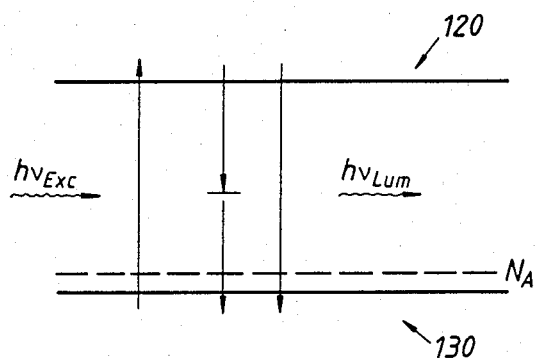

FIG. 1 shows a basic embodiment of the invention for purposes of describing the principles of operation of the sensor elements described herein. Active semiconductor layer 12, in which light absorption and recombination occur, is sandwiched between semiconductor layers 13, 14, respectively, and have low absorption for the wavelengths of the excitation radiation and emitted luminescence. Preferably, semiconductor layers 13 and 14 each have lattice constants which, as closely as possible, coincide with the lattice constant of active semiconductor layer 12. The coincidence of the lattice constants for the respective semiconductor layers 12, 13 and 14 limits recombination at the boundary surfaces between layers 12, 13 and 12, 14.

FIG. 2 illustrates the difference in the band gaps for the respective semiconductor layers shown in FIG. 1, with Eg12, Eg13 and Eg14 representing the respective energy level of semiconductor layers 12, 13 and 14. "d" defines the thickness of active semiconductor layer 12 relative to the thickness of semiconductor layers 13 and 14, and "X" is a length factor. The thickness of the different layers could be chosen in the interval 1–5 micrometers to obtain an optimum quantum efficiency.

FIG. 3 illustrates an embodiment of the invention wherein the basic structure of FIG. 1 is formed on a semiconductor substrate 15 of GaAs. Active semiconductor layer 12 is formed of $Al_yGa_{1-y}As$, semiconductor layer 13 is formed of $Al_zGa_{1-z}As$ and semiconductor layer 14 is formed of $Al_xGa_{1-x}As$, where representative values of x, y and z are as follows:

$0 < x < 0.6$ $0 < y < 0.3$ $0 < z < 0.6$

Other representative semiconductor materials for the semiconductor layers 12, 13 and 14 are $GaAs_xP_{1-x}$ and $In_xGa_{1-x}As_yP_{1-y}$, as well as other ternary and quaternary Group III-V semiconductors. The active luminescent layer 12 can also be doped with Si, Mg, and Ge, for example.

By utilizing a structure as shown in FIGS. 1 and 3, a high luminescence efficiency can be obtained even with relatively low dopant concentrations (down to $10^{15}$–$10^{17}$ cm$^{-3}$ with for example, GeAs:Ge). This is of great importance for the manufacture of reproducible luminescence sensor elements or transducers in systems where spectral analysis is utilized.

By doping the active layer, partly with dopants which provide shallow energy levels and partly with dopants which produce deep levels of interference (recombination centers), the luminescent time constant and the quantum efficiency of the material can be controlled and varied within wide limits, as will be explained further below. Also without intentional doping to obtain recombination centers, the luminescent time constant will be temperature-dependent since the coefficient for electron-hole recombination, B, is temperature-dependent.

FIG. 4 shows the energy level diagram for a sensor element wherein the emitted light is generated by band-band recombinations, the conduction band being shown at 120 and the valence band at 130. If luminescence re-absorption and boundary surface recombination are neglected, the luminescence time constant $\tau$ can be expressed as $$1/\tau = C_n \cdot P_T + B \cdot p_O$$

It is assumed that $d \ll L_n$, which can easily be realized, e.g. with GaAs and wherein $L_n$ = the diffusion length of electrons in the active layer $P_T$ = the number of empty noise levels $C_N$ = the recombination coefficient for electrons (at the noise level)

$B$ = the coefficient for electron-hole recombination, and $p_O$ = the number of holes in the valence band.

In a P-type material $p_T = N_{TT}$ where $N_{TT}$ is the total concentration of impurity levels.

The parameters $C_n$ and B have been measured for many semiconductor materials and are listed in readily available literature.

For GaAs, for doping with example, the following relationship is valid for Fe, Cr (T 250° K.)

$$\sigma_n = \sigma_a \cdot e^{-\frac{E_A}{K \cdot T}}$$

where $E_A = 0.25$ eV, K is Boltzmann's constant and $\sigma_n$ and $\alpha_x$ are a recombination cross section and a constant, respectively.

One further possibility is electron irradiation of the material for the formation of recombination centers with exceptionally temperature-dependent capture cross sections.

In a material having the energy level system illustrated in FIG. 4, the emitted light is generated by band-band recombinations. The number of recombination processes per unit of time, at which light is emitted, is proportional to the majority carrier concentration, that is, in the case of P-type semiconductors, proportional to the acceptor concentration. Since these radiating recombination processes compete with other recombination processes, at which the surplus energy of the charge carriers is not emitted in the form of light ("non-radiating" processes), the quantum efficiency $\eta$ of the material becomes dependent on the dopant concentration $N_A$ over a range of $10^{16}$ to $10^{19}$ cm$^{-3}$ (see FIG. 6). The detailed appearance of the curve is determined by the "non-radiating" recombination processes.

Figure 7:
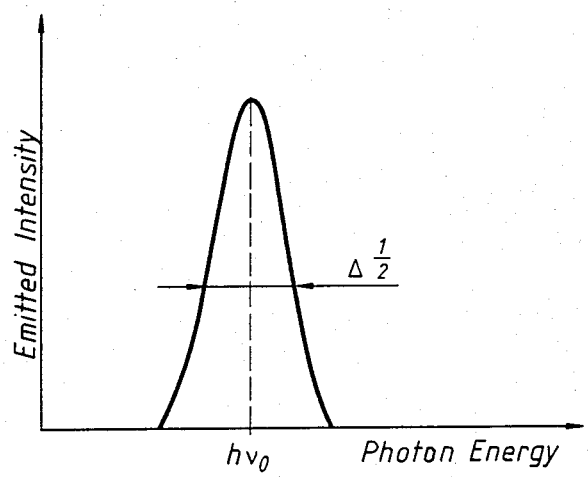
FIG. 7 shows the relationship between photon energy and emitted intensity of luminescent light spectrum emitted from luminescent materials in accordance with the invention.

In FIG. 4 the terms $\Delta n$, $n_T$, $\Delta p$, $E_F$ and Ga are defined as follows:

$\Delta n$ = Excited charge carriers
$n_T$ = Concentration
$\Delta p$ = The number of empty positions in the valence band
$E_F$ = Fermi energy level
Ga = Proportional constant The appearance of the emitted spectrum is characterized by the maximum value $h\nu_O$ and the full width of the photon energy at the half maximum value ($\Delta \frac{1}{2}$) (FIG. 7). These magnitudes are dependent on the dopant concentration $N_A$ in the manner indicated in FIG. 8. In FIG. 7 the emitted intensity is plotted along the y-axis and photon energy is plotted along the x-axis, the maximum of the curve occurring for photons of energy $h \nu_O$.

Figure 8:
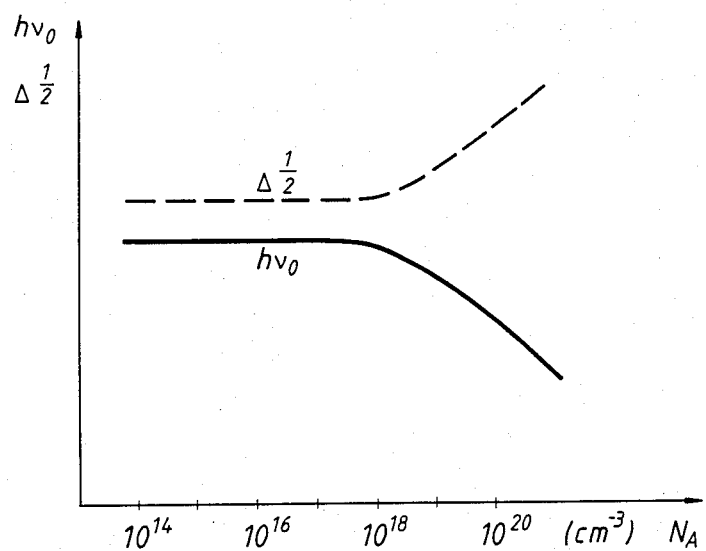
FIG. 8 illustrates the dependence of the photon energy of the peak emission and of the half-width of the doping concentration in accordance with the invention.

FIG. 8 shows a plot of photon energy $h \nu_O$ (full line) and $\Delta \frac{1}{2}$ (dash line) against dopant concentration $N_A$. The curves in FIG. 8 apply, in general, to most doped substances and semiconductor materials and indicate that the dopant concentration $N_A$ should be well below $10^{18}$ cm$^{-3}$ to facilitate the manufacture of sensor materials with reproducible luminescence spectra. A low concentration of dopant, however, results in a low quantum efficiency in homogeneous materials or single-layer structures because of superficial recombinations which occur.

By utilizing three-layer structures as shown in FIG. 9a, however, the recombination at the boundary surfaces of the active luminescent semiconductor layer 12 can be considerably reduced compared with those occurring in single-layer structures or homogeneous materials. That recombination reduction makes it possible to realize structures with a high quantum efficiency but with a low value of the dopant concentration $N_A$. These structures also provide other technical advantages, which have been discussed above. The structure shown in FIG. 9a has an active semiconductor layer 12' of GaAs sandwiched between semiconductor layers 13 and 14 respectively formed of the same semiconductor materials as shown in FIG. 3. "x" and "z" have the same range of values as set forth above in the description of FIG. 3. Active semiconductor layer 12' and semiconductor layers 13 and 14 are formed on a GaAs substrate 15 similar to the same substrate in the FIG. 3 embodiment. The energy gap diagram for the FIG. 9a embodiment is shown in FIG. 9b. As illustrated in FIG. 9b, semiconductor layers 13 and 14 have higher band gaps than that of active semiconductor layer 12'.

In one method of manufacturing the structure of FIG. 9a, after the growth of the $Al_xGa_{1-x}As$ layer 14 onto the substrate 15, the melt is removed from the substrate and a new melt, not containing Al, is introduced to the substrate, to occasion the growth of the active layer 12'. Part of the first melt may remain on the substrate 15, which means that the semiconductor active layer 12' will contain some Al. The problem is accentuated because of the high value of the distribution coefficient of Al. The Al content in the semiconductor active layer 12' causes a displacement of the luminescence peak towards shorter wavelengths.

The problem discussed above concerning the Al coating during the growth of a multi-layer substrate can be solved by using a four-layer structure according to FIG. 10a, which is a preferred embodiment. As shown in FIG. 10a, an additional layer 16 is grown after the first $Al_xGa_{1-x}As$ layer 14 on GaAs substrate 15. The semiconductor layer 16 is grown from a GaAs melt. Because of the Al coating, the semiconductor layer 16 will have the composition $Al_yGa_{1-y}As$, and thus has a band gap E which is greater than GaAs, as shown in FIG. 10b. After this the active semiconductor layer 12' is grown from a GaAs melt. The Al content in this active semiconductor layer 12' is negligible. Now, if the doping in active semiconductor layer 12' is higher than the doping in layer 14 and additionally, the semiconductor layer 12' is made considerably thicker than semiconductor layers 13 and 14, the main part of the luminescence will arise through "radiating" recombinations in the active semiconductor layer 12' notwithstanding the fact that the generated minority charge carriers are "closed in" between the semiconductor layers 13 and 14 due to the considerably higher band gaps existing in these outer semiconductor layers (FIG. 10b). The relationship of the band gaps for the various semiconductor layers of the preferred embodiment of FIG. 10a is shown in greater detail in FIG. 11.

"x" and "y" have the same range of values as specified in the embodiment of FIG. 3 described herein. It is understood from such description that the general requirement is that both "x" and "z" are greater than "y", such that the energy band gaps of the semiconductor layers sandwiching the active semiconductive layer are higher than the energy band gap of the active semiconductor layer. If other ternary or quaternary materials are used, the composition of the layers should also be chosen according to the aforementioned general rule.

In FIGS. 9a, 9b, 10a and 10b the distance from the upper surface of the structure is indicated by Z.

In FIG. 11, the conduction band is shown as 120 and the valence band as 130. The minority charge carriers are "closed in" in semiconductor layers 12' and 16. At the top of FIG. 11 the different layers 12', 13, 14 and 16 are shown. Structures according to FIG. 10a thus make possible the manufacture of photo-luminescence sensors with reproducible spectra.

Figure 6:
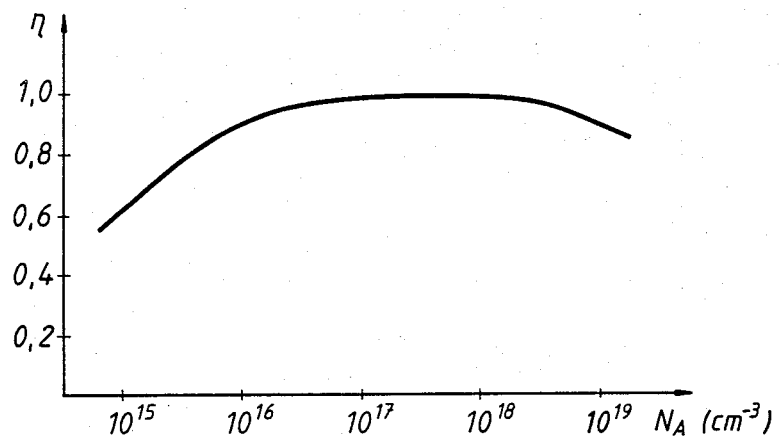
FIG. 6 shows the relationship between acceptor concentration and quantum efficiency in a semiconductor material in accordance with the invention.

A proper dopant concentration for the purposes of this invention can be derived from FIG. 6 wherein quantum efficiency is plotted against the dopant concentration, $N_A$. As seen from FIG. 6, a dopant concentration from $5 \times 10^{16}$ to $10^{19}$ cm$^{-3}$ results in a high quantum efficiency.

Those skilled in the art will recognize that the invention described herein can be modified in many ways; however, the scope of the invention is to be determined from the limitations set forth in the appended claims, which are to be accorded the equivalence to which they are entitled in accordance with the foregoing description and the prior art.

What is claimed is:

1. A sensor element adaptable for measurement of a physical parameter, formed of a crystalline material and emitting luminescence spectra, comprising:
   a first semiconductor layer composed of $Al_yGa_{1-y}As$ for emitting luminescence spectra upon excitation by light spectra and the influence of said physical parameter, and having a dopant concentration between $10^{15}$ to $10^{18}$cm$^{-3}$;
   a second semiconductor layer composed of $Al_zGa_{1-z}As$ formed over said first layer;
   a third semiconductor layer composed of $Al_xGa_{1-x}As$ formed under said first layer;
   said second and third semiconductor layers each having low absorption for the light excitation and light emission of said first layer, the respective lattice constants of the second and third semiconductor layers substantially coinciding with the lattice constant of said first semiconductor layer;
   where $0<x<0.6$, $0<y<0.3$, and $0<z<0.6$; and
   said first, second and third layers being of the same conductivity type.

2. A sensor element as claimed in claim 1 further comprising a substrate supporting said first, second and third semiconductor layers and formed of GaAs semiconductor material.

3. A sensor element adaptable for measurement of a physical parameter and formed of a crystalline material, comprising:
   a first semiconductor layer composed of GaAs for emitting luminescence spectra upon excitation by light spectra and the influence of said physical parameter;
   second and third semiconductor layers formed of $Al_xGa_{1-x}As$ and sandwiching said first semiconductor layer, each said second and third semiconductor layer having low absorption for the light excitation and light emission of said first layer, the respective lattice constants of the second and third semiconductor layers substantially coinciding with the lattice constant of said first semiconductor layer;
   where $0<x<0.6$;
   a semiconductor substrate formed of GaAs supporting said first, second and third semiconductor layers; and
   said first, second and third semiconductor layers being of the same conductivity type.

4. A sensor element as claimed in claim 3 further comprising a fourth semiconductor layer composed of $Al_yGa_{1-y}As$ sandwiched between said first and third semiconductor layers formed on top of said substrate and wherein $0<y<0.3$.

5. A sensor element in a fiber optic sensor system, adaptable for the measurement of one of temperature and pressure and formed of a crystalline material, comprising:
   a first semiconductor layer composed of $Al_yGa_{1-y}As$ for emitting luminescence spectra upon excitation by light spectra and the influence of one of said temperature and pressure, and having a dopant concentration between $10^{15}$ to $10^{18}$cm$^{-3}$;
   a second semiconductor layer composed of $Al_zGa_{1-z}As$ formed over said first layer;
   a third semiconductor layer composed of $Al_xGa_{1-x}As$ formed under said first layer;
   said second and third semiconductor layers each having low absorption for the light excitation and light emission of said first layer, the respective lattice constants of the second and third semiconductor layers substantially coinciding with the lattice constants of said first semiconductor layer;
   where $0<x<0.6$, $0<y<0.3$, and $0<z<0.6$; and
   said first, second and third semiconductor layers being of the same conductivity type.

6. A sensor element as claimed in claim 5 further comprising a substrate supporting said first, second and third semiconductor layers and formed of GaAs semiconductor material.

7. A sensor element in a fiber optic sensor system, adaptable for the measurement of one of temperature and pressure and formed of a crystalline material, comprising:
   a first semiconductor layer composed of GaAs for emitting said luminescence spectra upon excitation by light spectra and the influence of one of said temperature and pressure;
   second and third semiconductor layers formed of $Al_xGa_{1-x}As$ and sandwiching said first semiconductor layer, each said second and third semiconductor layer having low absorption for the light excitation and light emission of said first layer, the respective lattice constants of the second and third semiconductor layers substantially coinciding with the lattice constants of said first semiconductor layer;
   where $0<x<0.6$;
   a semiconductor substrate formed of GaAs supporting said first, second and third semiconductor layers; and
   said first, second and third semiconductor layers being of the same conductivity type.

8. A sensor element as claimed in claim 7, further comprising a fourth semiconductor layer composed of $Al_yGa_{1-y}As$ sandwiched between said first and third semiconductor layers formed on top of said substrate and wherein $0<y<0.3$.

9. A sensor element formed of a crystalline material and adaptable for measuring a physical parameter such as one of temperature and pressure, comprising:
   at least three semiconductor layers;
   a first semiconductor layer emitting luminescence upon excitation by light spectra and a change in said physical parameter, and at least one first dopant material providing shallow energy levels and with at least one second dopant material providing recombination centers, the concentration of said first dopant being between $10^{15}$ to $10^{18} cm^{-3}$;

at least second and third layers of semiconductor material surrounding said first layer and having low absorption for the light excitation and light emission of said first layer, the respective lattice constants of said second and third semiconductor layers substantially coinciding with the lattice constant of said first layer; and each of said at least three semiconductor layers having the same type of majority charge carriers.

10. A sensor element as claimed in claim 9, wherein said first layer is formed of GaAs as the semiconductor material.

11. A sensor element as claimed in claim 9, further comprising a fourth layer forming a substrate supporting said at least three semiconductor layers and being adjacent to one of said second and third layers.

12. A sensor element as claimed in claim 9, further comprising a fourth layer forming a substrate of GaAs, and supporting said at least three semiconductor layers and being adjacent one of said second and third layers, and wherein at least one of said second and third layers has a greater band gap than the band gap of said first layer.

13. The sensor element as claimed in claim 12, wherein said first layer is grown from a GaAs melt and having a greater thickness than said second and third layer.

14. The sensor element as claimed in claim 13, further comprising an additional layer formed between said first layer and at leasd one of said second and third layers, said first layer having a higher dopant concentration and a greater thickness than one of said second and third layers between which said additional layer is formed.

15. A sensor element as claimed in claim 9, wherein said first semiconductor layer is doped with both said first and second dopants, each being selected from the group consisting of Si, Mg and Ge.

16. A sensor element adaptable for measurement of a physical parameter and formed of a crystalline material, comprising:

a first semiconductor layer composed of $Al_y Ga_{1-y} As$ for emitting luminescence spectra upon excitation by light spectra and the influence of said physical parameter, and having a dopant concentration between $10^{15}$ to $10^{18} cm^{-3}$;

a second semiconductor layer composed of $Al_z Ga_{1-z} As$ formed over said first layer;

a third semiconductor layer composed of $Al_x Ga_{1-x} As$ formed under said first layer;

where $0 < x < 0.6$, $0 < y < 0.3$ and $0 < z < 0.6$; and said first, second and third layers being of the same conductivity type.

17. A sensor element as claimed in claim 16, wherein said physical parameter is one of temperature and pressure.

18. A sensor element as claimed in claim 16, further comprising a substrate supporting said first, second and third semiconductor layers and formed of GaAs semiconductor material.

19. A sensor element as claimed in claim 18, wherein said physical parameter is one of temperature and pressure.

20. A sensor element adaptable for measurement of a physical parameter and formed of a crystalline material, comprising:

a first semiconductor layer composed of GaAs for emitting luminescence spectra upon excitation by light spectra and the influence of said physical parameter;

second and third semiconductor layers formed of $Al_x Ga_{1-x} As$ and sandwiching said first semiconductor layer;

where $0 < x < 0.6$;

a semiconductor substrate formed of GaAs supporting said first, second and third semiconductor layers; and said first, second and third semiconductor layers being of the same conductivity type.

21. A sensor element as claimed in claim 20, wherein said physical parameter is one of temperature and pressure.

22. A sensor element as claimed in claim 20, further comprising a fourth semiconductor layer composed of $Al_y Ga_{1-y} As$ sandwiched between said first and third semiconductor layers formed on top of said substrate, and wherein $0 < y < 0.3$.

23. A sensor element as claimed in claim 22, wherein said physical parameter is one of temperature and pressure.

* * * * *